Dec. 11, 1945.    R. F. KNEISLEY ET AL    2,390,946
ELECTRONIC FENCE CIRCUIT CONTROL
Filed Sept. 10, 1943
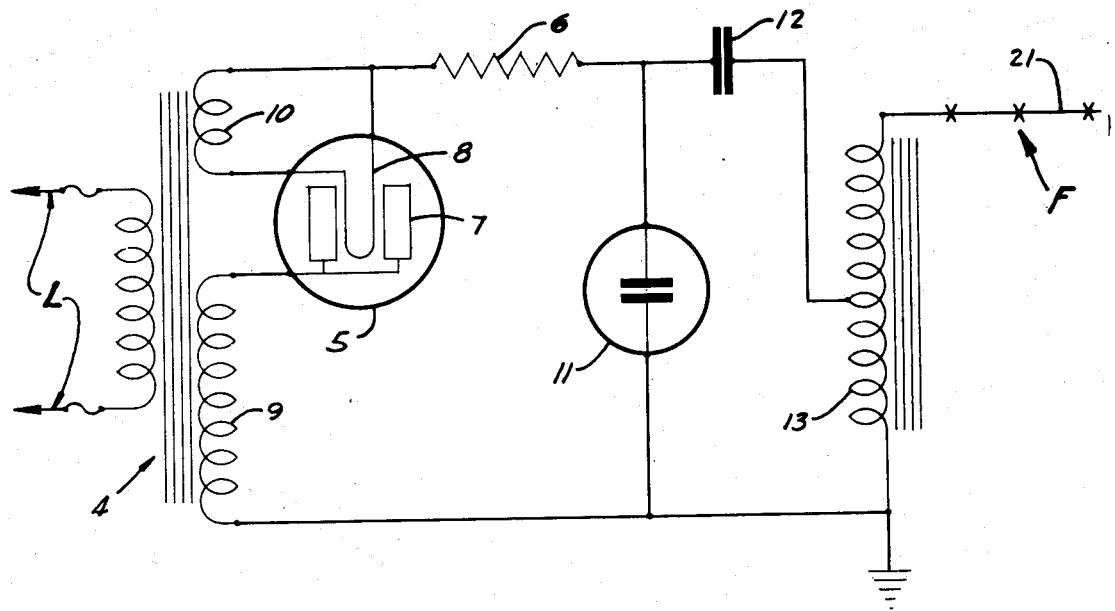
Fig. I
Richard F. Kneisley
Frank S. Hawley
INVENTORS
BY Edmund B Whitcomb Patented Dec. 11, 1945

2,390,946

UNITED STATES PATENT OFFICE 2,390,946

ELECTRONIC FENCE CIRCUIT CONTROL

Richard F. Kneisley and Frank S. Hawley, Toledo, Ohio, assignors to Kneisley Electric Company, Toledo, Ohio Application September 10, 1943, Serial No. 501,904

2 Claims. (Cl. 256—10)

This invention relates to an electronic impulse generating device and has for its principal object the provision of an improved and simplified electric fence controller.

This invention comprises a combination of a minimum number of circuit elements properly chosen and combined with each other so that the maximum effective impulse may be generated for the purposes intended.

The effective impulse which can be delivered to some distant point along the fence is a function of the instantaneous voltage produced by the generating and control unit and the conductivity of the soil in which the current impulse flows. In heavy, moist soils the conductivity of the soil is relatively high but in light, sandy, dry soils the conductivity is low with the result that no effective shock is produced unless the voltage at the output terminals of the fence control unit is high enough to cause a reasonable amount of current flow in the high resistive circuit path of the dry soil. On the other hand, if sufficient voltage is available to produce an effective shock under conditions of low soil conductivity, lethal currents may flow during rainy, wet periods when the soil is a much better conductor.

We have discovered that the lethal effects of the shock are eliminated by a reduction of the current flow to the value hereinafter referred to and that relatively high voltage with accompanying large currents can be tolerated, within these limits, provided the product of the time and magnitude of current flow is not excessive.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

The figure represents diagrammatically the circuits employed.

Connected with a source of power as an available 110 volt A. C. 60 cycle line L, we provide a power transformer 4, rectifier tube 5 and fixed resistor 6 which together constitute the power supply source for charging the control for the fence circuit F. The high voltage secondary winding 9 of the power transformer 4 is connected between the plate elements 7 of the rectifier tube and ground. The filament 8 of the tube is heated by the current supplied through the low voltage secondary winding 10. In one embodiment of our invention, which we have found satisfactory, we stepped the voltage up in the high voltage winding 9 to 650 volts, the low voltage or filament circuit for the rectifier tube 5 being only 2.5 to 3 volts, although the filament of the tube we employ is designed to operate at five volts so that by our arrangement the life of the tube is greatly extended. The lowered voltage, in turn, permits us to use a smaller transformer 4.

In our invention, we have provided a circuit of combined resistance, capacitance and inductance, as the control circuit which determines the quantity of electrical current delivered to the fence. Specifically, by reducing the current flow so as not to exceed a value of three milli-coulomb-seconds, a very effective fence circuit is produced but the lethal effects of the shock are eliminated. The resistance employed comprises a gas filled cold cathode discharge tube 11 which becomes conductive at a certain critical striking voltage which in the embodiment referred to is adapted to strike at about 600 volts but remains conductive as long as the potential across the tube elements is maintained at a value not lower than the arc potential of the tube. The condenser 12 which in the successful embodiment we have developed, is a 600 volt, 1 microfarad condenser and the transformer 13 comprise the other two elements of the control circuit for the fence F.

The rectified current flows from the tube 5 through the resistor 6 which in the embodiment referred to is of a 500,000 ohms resistance acting to limit the current flow which charges the condenser to a fixed quantity of electrical charge. The quantity of the charge is determined by the capacity of the condenser 12 and the striking voltage of the discharge tube 11. The resistor 6 is employed in the circuit to control the rate at which the condenser will become charged which in turn controls the rate at which the wire fence 21 will be excited with electric impulses. When the condenser 12 is charged to a potential equal to the striking voltage of the tube 11 the discharge tube becomes conductive allowing a current to flow from the condenser through the primary circuit of the auto transformer of the type illustrated at 13.

We have kept the reactance of the primary of transformer 13 to a low value so that the current discharge from the condenser 12 through the control circuit including the condenser, the discharge tube, and the connections to ground and the intermediary terminal of the transformer 13, will be more rapid. This will produce two desired results, the first of which is that by so doing the resistance of the tube 11 is greatly reduced with the result that a quick discharge of the condenser in the control circuit is effected and this gives rise to a periodic current flow, the frequency of which is determined by the value of the primary inductance and the capacity of the condenser. Now when the discharge of the condenser 12 is rapid, the rate of change of current in the primary circuit of transformer 13 will be higher with a resultant higher voltage produced across the secondary terminals, the character of the current produced per discharge being a very steep wave of extremely short duration.

By combining the circuit elements in this way, we use a relatively low voltage condenser 12 and provide for corresponding lower voltage requirements for the transformer 4 both resulting in minimumized space requirements and reduction of component costs throughout.

In operation, it will be seen that with our invention a series of successive impulses is delivered to the fence at spaced time intervals and when an animal touches the fence the output circuit is completed thereby causing current to flow through the animal's body during periods of impulse excitation. As previously explained, the voltage appearing at the output terminals of the control circuit is sufficiently high to provide for a relatively high voltage drop across the dry soil with sufficient potential available across the animal's body to produce an effective shock, but under condition of high soil conductivity, while the potential drop through the soil is lower, the duration of the current flow is so short that it will not produce lethal effects. Moreover, by our invention with the inductance or transformer 13 arranged and connected as indicated we thereby eliminate a substantial portion of material necessary for the manufacture of said inductance; by using the low capacity condenser 12 we reduce cost and decrease the time interval of the electric impulse delivered to the fence; we also provide by our invention electric impulses of high voltage and short duration in the fence circuit thereby making the fence circuit very effective and, at the same time, safe.

It is apparent that, within the scope of the invention, modifications and different arrangements may be made other than is herein disclosed, the invention comprehending all variations thereof.

What we claim is:

1. In a control for producing electrical impulses in an output circuit adapted to be connected to an alternating current input circuit, said input circuit connected to a transformer; a rectifying tube; a low voltage winding of said transformer connected to the filament of said tube; another winding of said transformer connected between the plate elements of said tube and ground; a current limiting resistance connected to said rectifying tube filament; a relatively low resistance rapid discharge cold gas-filled cathode tube, the negative electrode of which is connected to ground; a condenser, the positive electrode of said discharge tube being connected to one side of said condenser, said resistance connected to said condenser and said discharge tube and the value of the current limiting resistance being proportionate to the capacity of said condenser; a second transformer constituting an inductance the primary of which has a low value of reactance to facilitate rapid discharge of said tube, the other terminal of said condenser being connected to an intermediate terminal on said second transformer, one of the terminals of the transformer being connected to ground and the other terminal adapted to be connected to a wire of a fence.

2. In a control for producing electrical impulses in a fence circuit adapted to be connected to an alternating current input circuit, said input circuit connected to a transformer; a rectifying tube; a low voltage winding of said transformer connected to the filament of said tube; another winding of said transformer connected between the plate elements of said tube and a return circuit; a current limiting resistance connected to said rectifying tube filament; a relatively low resistance rapid discharge cold cathode, gas filled tube, one electrode of which is connected to the return circuit; a condenser, one side of which is connected to the other electrode of said discharge tube, said resistance connected to said condenser and said discharge tube and the value of the current limiting resistance being proportionate to the capacity of the condenser to regulate the charging cycle of said condenser; a high voltage step up transformer, the primary of which has a low impedance to facilitate rapid discharge of said tube, the primary of the transformer being connected between the other side of said condenser and the common return circuit, one terminal of the secondary of the transformer adapted to be connected to the wire of a fence, the opposite terminal being connected to ground.

RICHARD F. KNEISLEY.
FRANK S. HAWLEY.